United States Patent [19]

De Vito

[11] Patent Number: 4,472,007
[45] Date of Patent: Sep. 18, 1984

[54] CAGE ASSEMBLY

[75] Inventor: Edward F. De Vito, Torrington, Conn.

[73] Assignee: The Torrington Company, Torrington, Conn.

[21] Appl. No.: 481,716

[22] Filed: Apr. 4, 1983

[51] Int. Cl.³ .................. F16C 33/48; F16C 33/38
[52] U.S. Cl. ............................ 308/217; 308/201
[58] Field of Search .............. 308/201, 217, 218; 277/220, 221, 222; 24/230.5 TP, 399, 401

[56] References Cited
U.S. PATENT DOCUMENTS 1,266,145  5/1918  Newmann ........................ 308/201
1,340,310  5/1920  Wolff ........................ 308/201 X
3,399,008  8/1968  Farrell et al. ........................ 308/217
4,239,304  12/1980  Wakunami ........................ 308/217
4,397,507  8/1983  Kraus ........................ 308/217

Primary Examiner—Stuart S. Levy
Assistant Examiner—Thomas R. Hannon
Attorney, Agent, or Firm—F. S. Troidl

[57] ABSTRACT

The roller cage is a split, annular cage made of a flexible resilient material. The opposite abutting faces of the cage forming the split are provided with locking members in the form of male and female members with the male member having projections fitting into complementary grooves in the female member.

3 Claims, 5 Drawing Figures

CAGE ASSEMBLY

This invention relates to roller cages. More particularly, this invention is a new and improved split, annular roller cage assembly.

The main reason for a split cage is to allow the bearing to be opened up into a C-shape so it can be placed sideways over a shaft or fed axially over a shaft with a surface feature of greater diameter than the bearing operating area.

Briefly described, the new roller cage assembly comprises a split, annular member made of a flexible resilient material. A plurality of circumferentially spaced cross-bars in the annular member define pockets for the rollers. Locking means detachably secure the abutting face of the annular member. The locking means comprises a projection at one abutting face of the annular member and a complementary slot in the opposite abutting face into which the projection extends. The sides of either the projection or the complementary slot have at least one tab which fits into a complementary groove in the side of the other member.

The invention, as well as its many advantages, may be further understood by reference to the following detailed description and drawing in which.

In the various figures, like parts are referred to by like numbers.

Figure 1:
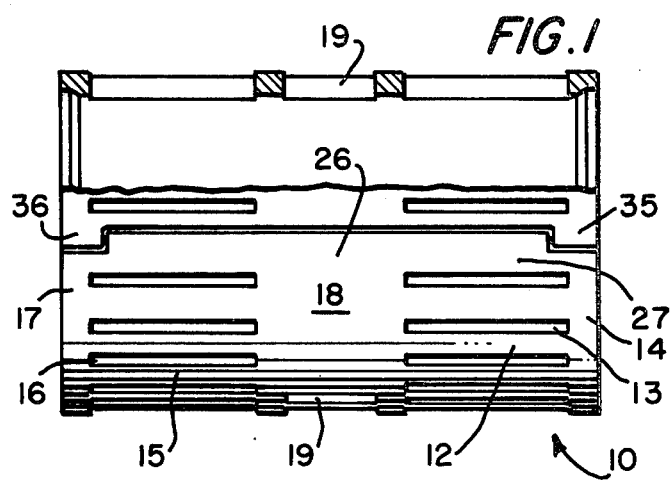
FIG. 1 is a side view, partly in section, showing a preferred embodiment of the invention.
Figure 2:
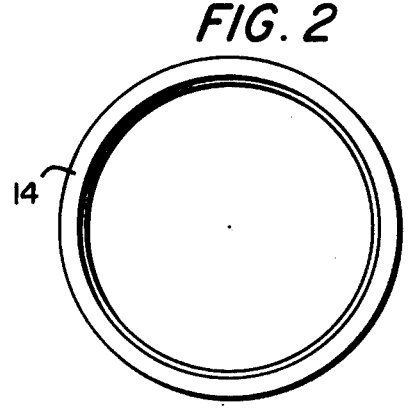
FIG. 2 is an end view of the preferred embodiment of FIG. 1.

Referring to the drawings and, more particularly, to FIG. 1, the roller cage assembly includes a split, annular member 10. The annular member is preferably made of a flexible resilient material, such as a flexible resilient plastic material. In the preferred embodiment of FIG. 1 there are two sets of circumferentially spaced cross-bars to provide pockets for receiving rollers (not shown). Cross-bars 12, forming pockets 13, extend longitudinally from end rim 14. Cross-bars 15, forming pockets 16, extend longitudinally from end rim 17. Pockets 13 and pockets 16 are separated by central rim 18 which is provided with a few circumferentially spaced lubrication slots 19.

Figure 3:
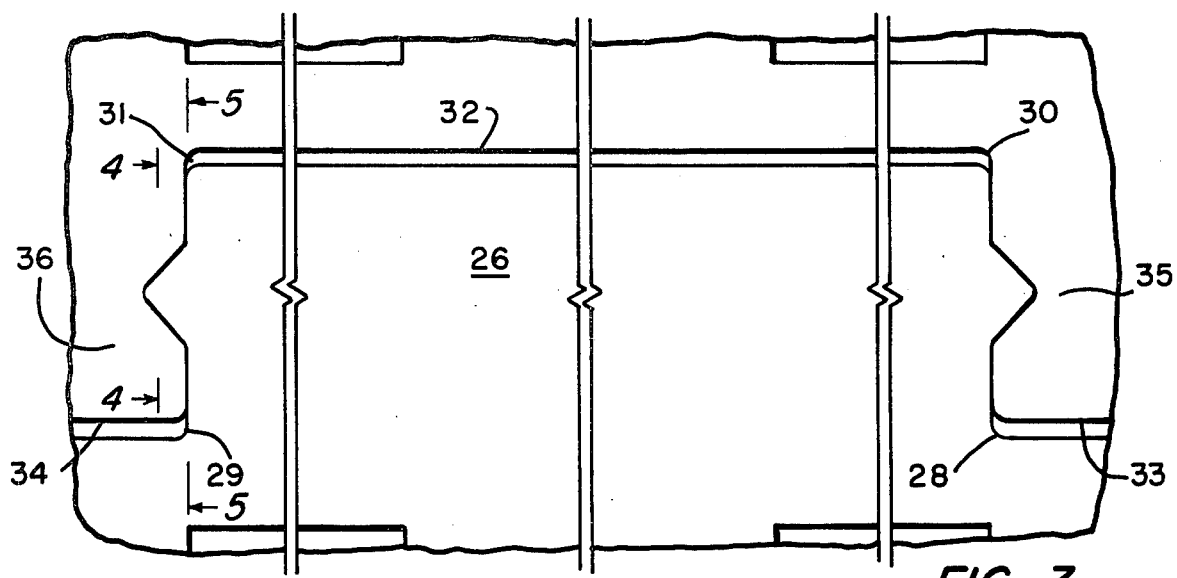
FIG. 3 is a fragmentary, enlarged view showing the male and female terminal ends of the cage.

To lockingly engage the abutting faces of the cage 10 one abutting face is provided with a male member in the form of a projection 26. The projection 26 extends circumferentially from the long cross-bar 27 which extends longitudinally the entire length between rims 14 and 17. Projection 26 is longitudinally centrally located with its radially extending longitudinally separated sides 28 and 29 (see FIG. 3) being located just inside of the end rims 14 and 17, respectively. Sides 28 and 29 each extend along a single radial plane.

The other abutting face of the cage 10 is provided with a female member in the form of a slot complementary to the projection 26. The slot is defined by circumferentially extending radial sides 30 and 31 and longitudinally extending radial side 32. Circumferentially extending radial sides 30 and 31 end at longitudinally extending radial sides 33 and 34, respectively, thus providing circumferentially extending legs 35 and 36, respectively. In the locked position, the projection 26 is lockingly received in the slot.

Figure 4:
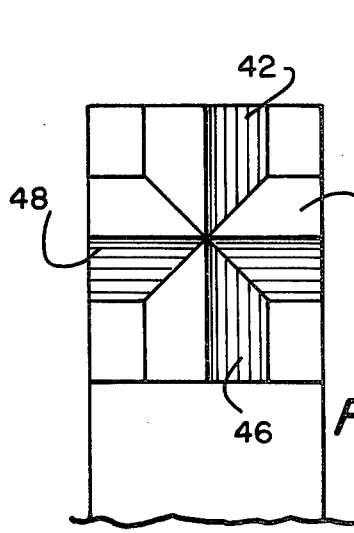
FIG. 4 shows the tabs in the sides of the male member and taken generally along lines 4—4 of FIG. 3 and in the direction of the arrows.
Figure 5:
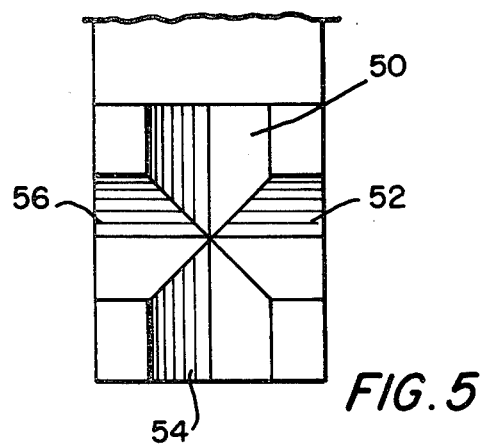
FIG. 5 shows the grooves in the female member and taken generally along lines 5—5 of FIG. 3 and in the direction of the arrows.

Each radially extending side 28 and 29 of the male member or projection 26 is provided with a plurality of tabs in the form of a cross. As shown in FIG. 4, the tabs in the form of a cross include four tabs 42, 44, 46, and 48 interconnected at their inner ends. Tabs 42 and 46 are aligned; aligned tabs 44 and 48 are perpendicular to aligned tabs 42 and 46 so that the four tabs are in the shape of a cross, with one leg of the cross extending radially and the other leg of the cross extending generally circumferentially.

Each radially extending side 30 and 31 of the slot or female member is provided with grooves 50, 52, 54, and 56 which are interconnected at their inner ends. Grooves 50 and 54 are aligned; aligned grooves 52 and 56 are perpendicular to aligned grooves 50 and 54 so that the four grooves are in the shape of a cross with one leg of the cross extending radially and the other leg of the cross extending generally circumferentially.

Because the material of the cage 10 is made of a plastic or other suitable, flexible and resilient material, to lock the two abutting faces of the cage 10, the tabs 42, 44, 46, and 48 are pressed into the complementary grooves 50, 52, 54, and 56, respectively.

With the cross form of the tabs and grooves, the abutting faces of the cage are locked against radial, axial, and circumferential relative movement. If it is desired to have a certain amount of circumferential relative movement, the tabs 42 and 46 with the corresponding grooves 50 and 54 may be eliminated and only a single generally circumferential tab and single complementary groove provided in the sides of the male member and the female member, respectively. If, on the other hand, a certain amount of relative radial movement is desired between the abutting faces of the cage, the tabs 44 and 48 with the complementary grooves 52 and 56, respectively, may be eliminated leaving a single radial tab and a single complementary groove on the male member and the female member, respectively.

I claim:

1. A roller cage assembly comprising: a flexible resilient annular member split at a point on its circumference to provide abutting faces; a plurality of circumferentially spaced cross-bars in said annular member defining pockets for rolling elements; and locking means for detachably securing the abutting faces of the annular member, said locking means comprising a circumferentially extending projection with radially extending sides at one abutting face of the annular member, and a complementary slot with circumferentially extending sides in the opposite abutting face into which the projection extends, the sides of one of said projection and complementary slot each having at least one tab in the form of a cross and the sides of the other having a complementary groove in the form of a cross which lockingly engages said tab.

2. A roller cage assembly in accordance with claim 1 wherein: said at least one tab in the form of a cross is located in each side of the projection.

3. A roller cage assembly in accordance with claim 2 wherein: there are a plurality of tabs arranged in the form of a cross on each side of the projection, one leg of the cross extending radially with the other leg being perpendicular to the radially extending leg, and a plurality of complementary grooves in the form of a cross are located on each side of the slot.

* * * * *